US012632069B2

(12) United States Patent
Kim et al.

(10) Patent No.: US 12,632,069 B2
(45) Date of Patent: May 19, 2026

(54) AUTOMATED GUIDED VEHICLE AND CONTROL METHOD FOR AUTOMATED GUIDED SYSTEM INCLUDING THE SAME

(71) Applicant: Samsung Display Co., Ltd., Yongin-si (KR)

(72) Inventors: Yonggu Kim, Yongin-si (KR); Sanghoon Ji, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 199 days.

(21) Appl. No.: 18/658,453

(22) Filed: May 8, 2024

(65) Prior Publication Data

US 2024/0402731 A1 Dec. 5, 2024

(30) Foreign Application Priority Data

May 30, 2023 (KR) ........................ 10-2023-0068954

(51) Int. Cl.
G05D 1/86 (2024.01)
G05D 1/247 (2024.01)
G05D 1/633 (2024.01)

(52) U.S. Cl.
CPC .............. G05D 1/86 (2024.01); G05D 1/247 (2024.01); G05D 1/633 (2024.01)

(58) Field of Classification Search
CPC ........... G05D 1/86; G05D 1/633; G05D 1/247
See application file for complete search history.

(56) References Cited

U.S. PATENT DOCUMENTS

| | | | |
|---|---|---|---|
| 10,233,021 B1 | 3/2019 | Brady et al. | |
| 10,434,924 B2 | 10/2019 | Alfaro et al. | |
| 11,202,215 B2 | 12/2021 | Marumo et al. | |
| 2022/0300000 A1* | 9/2022 | Poluboiarinov | ....... G06V 20/58 |

FOREIGN PATENT DOCUMENTS

| | | |
|---|---|---|
| CN | 114212292 | 3/2022 |
| CN | 114930263 | 8/2022 |
| JP | 2021-140638 | 9/2021 |
| KR | 10-2021-0018455 | 2/2021 |

* cited by examiner

*Primary Examiner* — Michael D Lang
(74) *Attorney, Agent, or Firm* — Womble Bond Dickinson (US) LLP

(57) ABSTRACT

Provided is a control method for an automated guided system including a step of providing an automated guided vehicle including a sensor and a watchdog timer, a controller, and an alarm, an initializing step of initializing a count value, a first checking step of checking an abnormal state of the sensor, a count increasing step of increasing the count value, and a step of performing a recovery operation, the step of performing the recovery operation includes a second checking step of rechecking the abnormal state, a step of turning on the alarm; a third checking step of rechecking the abnormal state, and a step of turning off the alarm.

20 Claims, 6 Drawing Sheets

AUTOMATED GUIDED VEHICLE AND CONTROL METHOD FOR AUTOMATED GUIDED SYSTEM INCLUDING THE SAME

CROSS-REFERENCE TO RELATED APPLICATIONS

This application claims priority to and benefits of Korean Patent Application No. 10-2023-0068954 under 35 U.S.C. § 119, filed on May 30, 2023, the entire contents of which are incorporated herein by reference.

BACKGROUND

1. Technical Field

The disclosure herein relates to a method for controlling an operation of an automated guided vehicle. By way of example, the disclosure relates to a method for controlling the operation of an automated guided vehicle in correspondence to the activation of a sensor.

2. Description of the Related Art

An automated guided vehicle (AGV), which is also called an autonomous guided vehicle, is a vehicle in which an automated guided apparatus using the principle such as the electromagnetics or optics is mounted to travel along a specified guidance path and which is provided with a safety protection function and various transfer functions. The automated guided vehicle is highly automated and intellectualized to be increasingly used in various places including a storehouse or a warehouse. In a site in which the automated guided vehicle is used, users and various different kinds of vehicles also travel therein. As a result, a collision accident frequently occurs to the automated guided vehicle on the move and the automated guided vehicle becomes damaged or hits to cause an injury to the user. Therefore, in order to reduce the damage to the automated guided vehicle and the injury to the user, it is necessary to control the automated guided vehicle on the move.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a control method for safely and efficiently operating an automated guided vehicle.

An embodiment of the disclosure provides a control method for an automated guided system that may include a step of providing an automated guided vehicle including a sensor and a watchdog timer that detects a user, a controller that receives a signal from the sensor, and an alarm that provides an alarm to the user; an initializing step of receiving, by the controller, the signal and initializing, by the watchdog timer, a count value; a first checking step for checking, by the controller, an abnormal state of the sensor; a count increasing step of increasing, by the watchdog timer, the count value in case that it is determined that the sensor is in the abnormal state; and a step of performing, by the controller, a recovery operation in case that the count value is equal to or greater than a selectable value, wherein the step of performing the recovery operation may include a second checking step of rechecking, by the controller, the abnormal state of the sensor; a step of turning on, by the controller, the alarm in case that it is determined that the sensor is in the abnormal state; a third checking step of rechecking, by the controller, the abnormal state of the sensor; and a step of turning off, by the controller, the alarm in case that it is determined that the sensor is in a normal state changed from the abnormal state.

In an embodiment, the automated guided vehicle may operate at a first speed or a second speed slower than the first speed.

In an embodiment, the second speed may be about a half of the first speed.

In an embodiment, the sensor may include a door sensor, and the automated guided vehicle may operate at the second speed in case that the door sensor is detected to be open.

In an embodiment, the normal state may include a first normal state where the controller determines that the user is not present in an operation area of the automated guided vehicle, and, in the first normal state, the controller may control the automated guided vehicle to operate at the first speed.

In an embodiment, the normal state may further include a second normal state where the controller determines that the user is present in the operation area of the automated guided vehicle, and, in the second normal state, the controller controls the automated guided vehicle to operate at the second speed.

In an embodiment, the abnormal state may include a first abnormal state where the controller does not receive the signal to determine that the sensor has not detected the user's move into the operation area even though the user has moved into the operating area; and a second abnormal state where the controller does not receive the signal to determine that the sensor has not detected the user's move out of the operation area even though the user has moved out of the operation area, and wherein the step of performing a recovery operation may further include a step of controlling, by the controller, the automated guided vehicle to operate at the second speed.

In an embodiment, the first checking step may be performed in case that the count value is less than the selectable value after the step of increasing the count value.

In an embodiment, the initialization step may be performed again in case that it is determined in the first checking step that the sensor is in the normal state.

In an embodiment, the initialization step may be performed in case that it is determined in the second checking step that the sensor is in the normal state.

In an embodiment, the initialization step may be performed again after the step of performing a recovery operation.

In an embodiment, the step of turning on the alarm may be performed in case that it is determined in the third checking step that the sensor is in the abnormal state.

In an embodiment, the count increasing step may include a step for increasing the count value by 1.

In an embodiment, the selectable value may be about 3.

In an embodiment, the controller may check a communication state with the sensor at every selectable time, and transmit a wakeup signal of rebooting the sensor in case that the sensor is in the abnormal state.

In an embodiment of the disclosure, an automated guided vehicle may include a controller that receives a signal from an external sensor, a watchdog timer, and an alarm, wherein the controller determines whether the sensor is in a normal state or an abnormal state, and selects a speed of the automated guided vehicle between a first speed or a second speed slower than the first speed, the watchdog timer initializes a count value in case that the sensor is in the normal state, and increases the count value in case that the sensor is in the abnormal state, and the controller rechecks the abnormal state of the sensor in case that the count value is equal to or greater than a selectable value, turns on the alarm in case that it is determined that the sensor is in the abnormal state, rechecks the abnormal state of the sensor after the alarm is turned on, turns off the alarm in case that it is determined that the sensor is in the normal state changed from the abnormal state, and selects the second speed in case that it is determined that the sensor is in the abnormal state.

In an embodiment, the normal state may include a first normal state where the controller determines that the user is not present in an operation area of the automated guided vehicle, and the automated guided vehicle may operate at the first speed in case that the sensor is in the first normal state.

In an embodiment, the normal state may include a second normal state where the controller determines that the user is present in the operation area of the automated guided vehicle, and the automated guided vehicle may operate at the second speed in case that the sensor is in the second normal state.

In an embodiment, the abnormal state may include a first abnormal state where the controller does not receive the signal to determine that the sensor has not detected the user's move into the operation area even though the user has moved into the operating area; and a second abnormal state where the controller does not receive the signal to determine that the sensor has not detected the user's move out of the operation area even though the user has moved out of the operation area, and wherein the automated guided vehicle may operate at the second speed in case that the counter value is at least the selectable value.

In an embodiment, the second speed may be about a half of the first speed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

Figure 1:
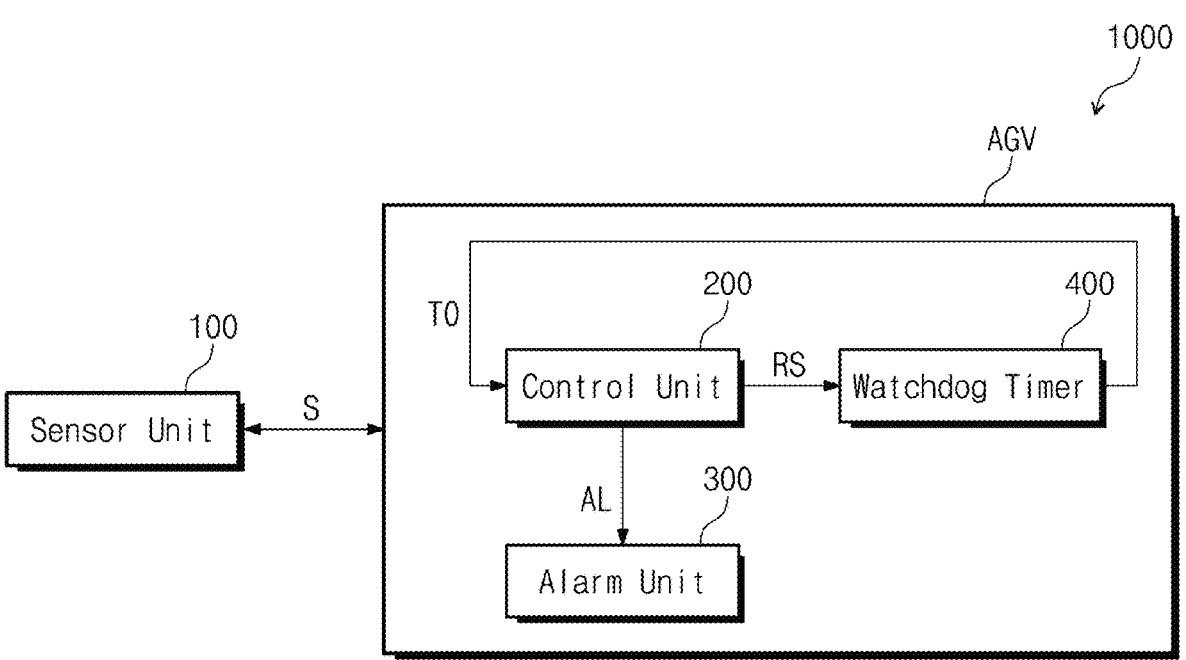
FIG. 1 is a structure flowchart of an automated guided vehicle and a sensor unit according to an embodiment of the disclosure.

It will be understood that when an element or layer is referred to as being "on", "connected to" or "coupled to" another element or layer, it can be directly on, connected or coupled to the other element or intervening third elements may be present.

Like reference numerals in the drawings refer to like elements. In the drawings, the thickness and the ratio and the dimension of elements are exaggerated for effective description of the technical contents.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

Terms such as first, second, and the like may be used to describe various components, but these components should not be limited by the terms. These terms are only used to distinguish one element from another. For instance, a first component may be referred to as a second component, or similarly, a second component may be referred to as a first component, without departing from the scope of the disclosure.

The terms such as "under", "lower", "on", and "upper" are used for explaining associations of items illustrated in the drawings. The terms are used as a relative concept and are described with reference to the direction indicated in the drawings.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

It should be understood that the terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Hereinafter, embodiments of the disclosure will be described with reference to the accompanying drawings.

FIG. 1 is a structure flowchart of an automated guided vehicle and a sensor unit (sensor) according to an embodiment of the disclosure.

Referring to FIG. 1, the automated guided system 1000 may include the sensor unit 100 and the automated guided vehicle AGV.

The sensor unit 100 may detect a user. The sensor unit 100 may be disposed outside the automated guided vehicle AGV to detect in real time the entry and exit of a user in an operation area ADA (see FIG. 2) of the automated guided vehicle AGV. The sensor unit 100 may generate a signal of entrance and exit information of the user in the operation area ADA to transmit the signal to the automated guided vehicle AGV. The sensor unit 100 may transmit and receive the signal S with the automated guided vehicle AGV.

The sensor unit 100 may include a sensor using wireless communication and a camera sensor, or the like within the spirit and the scope of the disclosure. For example, the sensor may include a beacon carried by the user. The wireless communication may include WiFi, Zigbee communication, RFID, or the like within the spirit and the scope of the disclosure. However, the embodiment is an example, and the wireless communication method according to an embodiment of the disclosure is not limited thereto and may be provided in various ways. The camera sensor may include a CCTV camera or the like within the spirit and the scope of the disclosure.

A substrate may be loaded on the automated guided vehicle AGV. The automated guided vehicle AGV may store and/or transport the loaded substrate. For example, the automated guided vehicle AGV may safely transport the substrate on which one process has been performed to a site for another process while protecting the substrate from an external impact.

The automated guided vehicle AGV may include a control unit (controller) 200, an alarm unit (alarm) 300, and a watchdog timer 400.

The control unit 200 may control the operation of the automated guided vehicle AGV. The control unit may receive the signal S transmitted from the sensor unit 100. The control unit 200 may determine whether the user is present in the operation area ADA on the basis of the signal S transmitted from the sensor unit 100.

The control unit 200 may control the speed of the automated guided vehicle AGV to a first speed or a second speed slower than the first speed. The automated guided vehicle AGV may operate at the first speed. In case that the control unit 200 determines that the user is present in the operation area ADA on the basis of the signal S, the automated guided vehicle AGV may operate at the second speed. For example, the first speed may be about 1000 mm/sec, and the second speed may be about 500 mm/sec.

The control unit 200 may receive the signal S from the sensor unit 100 to determine the state of the sensor unit 100.

The alarm unit 300 may provide a notification to cause a user US (see FIG. 2) to detect an abnormality. The notification may be provided to the user US in a type of an acoustic signal or a vibration signal. The control unit 200 may transmit an alarm signal AL to turn on or off the alarm unit 300. In case that the control unit 200 determines that the state of the sensor unit 100 is abnormal, the alarm unit 300 may be turned on.

The watchdog timer 400 is a timer for basically performing counting for a selectable time. In case that a counter initialization operation is not performed in response to a normal state, the counter value expires and the watchdog timer 400 may detect the occurrence of an abnormal state.

The control unit 200 may activate to operate the watchdog timer 400. The control unit 200 may transmit a reset signal RS to the watchdog timer 400.

In case that receiving the reset signal RS, the watchdog timer 400 may initialize the count value. In case that the control unit 200 does not receive the signal from the sensor unit 100 for a selectable time, the watchdog timer 400 may increase the count value. In case that the count value exceeds a selectable value to expire, the watchdog time 400 may transmit, to the control unit 200, a timeout signal TO.

The automated guided vehicle AGV according to an embodiment of the disclosure may further include a distance sensor. For example, the distance sensor may be implemented with a Radio Detection And Ranging (RADAR), a Light Detection And Ranging (LIDAR), a Sound Of Navigation And Ranging (SONAR), an ultrasonic sensor, an infrared sensor, a laser senor or the like within the spirit and the scope of the disclosure. The automated guided vehicle AGV may detect, via the distance sensor, whether the user is present in a neighboring area.

Unlike the disclosure, in case that the presence of the user is determined only using the distance sensor, the braking distance of the automated guided vehicle AGV may become longer even in case that the user is detected. Due to this, it may be difficult to ensure the safety of the user. However, according to the disclosure, the automated guided vehicle AGV may include the watchdog timer 400. In case that it is determined to be in the abnormal state using the watchdog timer 400, the control unit 200 may control the automated guided vehicle AGV to travel at the second speed lower than the first speed. Due to this, the automated guided vehicle AGV may have a shorter braking distance than a case of operating at the first speed. Therefore, the automated guided vehicle AGV with improved safety and reliability and the control method for the automated guided system 100 including the same may be provided.

Figure 2:
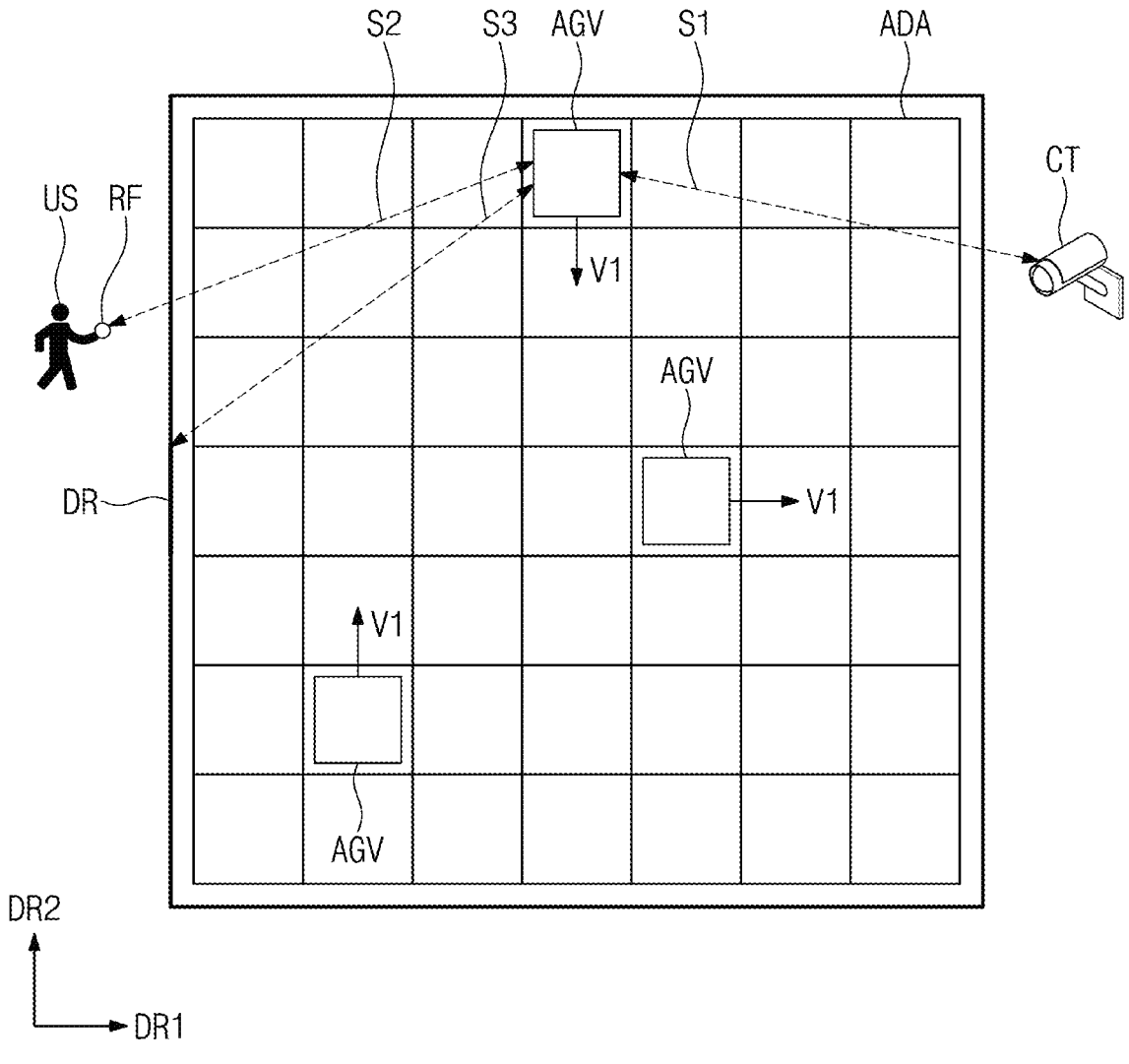
FIG. 2 is a schematic diagram showing the operations of an automated guided vehicle and sensor unit in a first normal state according to an embodiment of the disclosure.

FIG. 2 is a schematic diagram showing the operations of an automated guided vehicle and a sensor unit in a first normal state according to an embodiment of the disclosure.

Referring to FIGS. 1 and 2, the user US may be present outside the operation area ADA.

The automated guided vehicle AGV may move to a first direction DR1 and a second direction DR2 within the operation area ADA. One or more automated guided vehicles AGV may move within the operation area ADA. The automated guided vehicles AGV may operate at the first speed V1 or the second speed V2 (see FIG. 3).

The sensor unit 100 may include a camera CT, an RFID tag RF, and a door sensor DR. The signal S provided by the sensor unit 100 to the automated guided vehicle AGV may include a first signal S1, a second signal S2, and a third signal S3.

The camera CT may detect whether the user US is in the operation area ADA. The camera CT may generate a signal of the detected information to transmit the first signal S1 to the control unit 200 of the automated guided vehicle AGV. The first signal S1 may include information that the user US is detected outside the operation area ADA.

An example wireless communication is shown as an RFID tag RF, but another wireless communication method shown in the disclosure may also be used. The user US is shown as holding the RFID tag on his hand, but the RFID tag RF may identify the location of the user US in another type. For example, the RFID tag RF may be a card hung around the neck of the user US in a necklace type.

The RFID tag RF may detect whether the user US is in the operation area ADA. The RFID tag RF may generate a signal of the detected information to transmit the second signal S2 to the control unit 200 of the automated guided vehicle AGV. The second signal S2 may include information that the user US is detected outside the operation area ADA.

The normal state may be defined where the automated guided vehicle AGV actively communicates with the sensor unit 100. The normal state may include a first normal state. The first normal state may be defined where the control unit 200 determines that the user US is not present in the operation area ADA of the automated guided vehicle AGV.

In the first normal state, the control unit 200 may control the automated guided vehicle AGA to operate at a first speed V1.

In case that receiving the first signal S1 and the second signal S2, the control unit 200 may control the speed of the automated guided vehicle AGV to the first speed V1. The first speed V1 may be about 55 m/min or about 65 m/min. For example, the first speed V1 may be about 60 m/min.

In FIG. 2, the door sensor DR may be in a closed state. The door sensor DR may transmit the third signal S3 to the control unit 200 of the automated guided vehicle AGV. The third signal S3 may include information that the door used to enter the operation area ADA is in a closed state.

Figure 3:
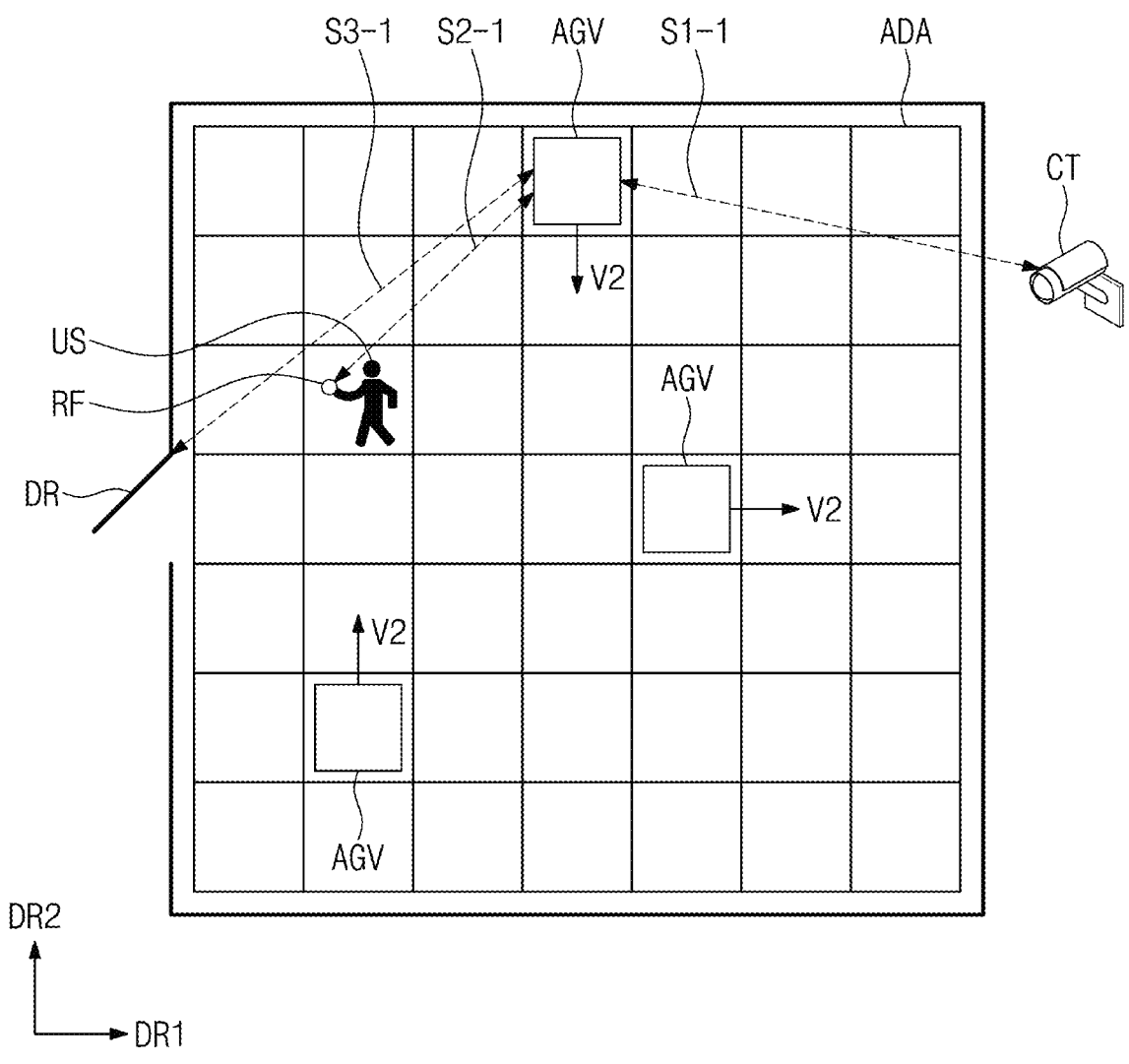
FIG. 3 is a schematic diagram showing the operations of an automated guided vehicle and sensor unit in a second normal state according to an embodiment of the disclosure.

FIG. 3 is a schematic diagram showing the operations of an automated guided vehicle and sensor unit in a second normal state according to an embodiment of the disclosure. In FIG. 3, like reference numerals are given to like elements illustrated in FIG. 2, and the description of the like elements may be omitted.

Referring to FIGS. 1 and 3, the user US may be present outside the operation area ADA.

The signal S provided by the sensor unit 100 to the automated guided vehicle AGV may include a 1-1st signal S1-1, a 2-1st signal S2-1, and a 3-1st signal S3-1.

The camera CT may generate a signal of the detected information to transmit the 1-1st signal S1-1 to the control unit 200 of the automated guided vehicle AGV. The 1-1st signal S1-1 may include information that the user US is detected in the operation area ADA.

The RFID tag RF may generate a signal of the detected information to transmit the 2-1st signal S2-1 to the control unit 200 of the automated guided vehicle AGV. The 2-1st signal S2-1 may include information that the user US is detected in the operation area ADA.

The normal state may include a second normal state. The second normal state may be defined where the control unit 200 determines that the user US is present in the operation area ADA of the automated guided vehicle AGV.

In the second normal state, the control unit 200 may control the automated guided vehicle AGA to operate at a second speed V2.

In case that receiving the 1-1st signal S1-1 and the 2-1st signal S2-1, the control unit 200 may control the speed of the automated guided vehicle AGV to the second speed V2. The second speed V2 may be slower than the first speed V1 (see FIG. 2). The second speed V2 may be about 25 m/min or about 35 m/min. For example, the second speed V2 may be about 30 m/min. For example, the second speed V2 may be a half of the first speed V1 (see FIG. 2).

In FIG. 3, the door sensor DR may be in an open state. The door sensor DR may transmit the 3-1st signal S3-1 to the control unit 200 of the automated guided vehicle AGV. The 3-1st signal S3-1 may include information that the door used to enter the operation area ADA is in an open state. The control unit 200 receiving the 3-1st signal S3-1 may determine that the user US is present in the operation area ADA. The control unit 200 may control the speed of the automated guided vehicle AGV to the second speed V2.

According to the disclosure, the automated guided vehicle AGV may increase the speed to the maximum in case that the user US is not present in the operation area ADA. Operating at the maximum speed may be the case where the automated guided vehicle AGV operates at the first speed V1

(see FIG. 2). The automated guided vehicle AGV may operates at a half of the speed in case that the user US is present in the operation area ADA. Here, the automated guided vehicle AGV may operates at the second speed V2. The automated guided vehicles AGV may operate at the second speed V2 slower than the first speed V1 (see FIG. 2) and the braking distance may be reduced. In other words, the automated guided vehicle AGV may operate at the maximum speed in the first normal state (see FIG. 2) where it is determined that the user US is not around, and reduce the speed to be able to swiftly stop at the second normal state (see FIG. 3) in case that it is determined that the user US is around. Accordingly, the automated guided vehicle AGV may be provided which efficiently operates and considers the safety of the user US, and a control method for the automated guided system 1000 including the automated guided vehicle AGV with improved safety and reliability may be provided.

Figure 4:
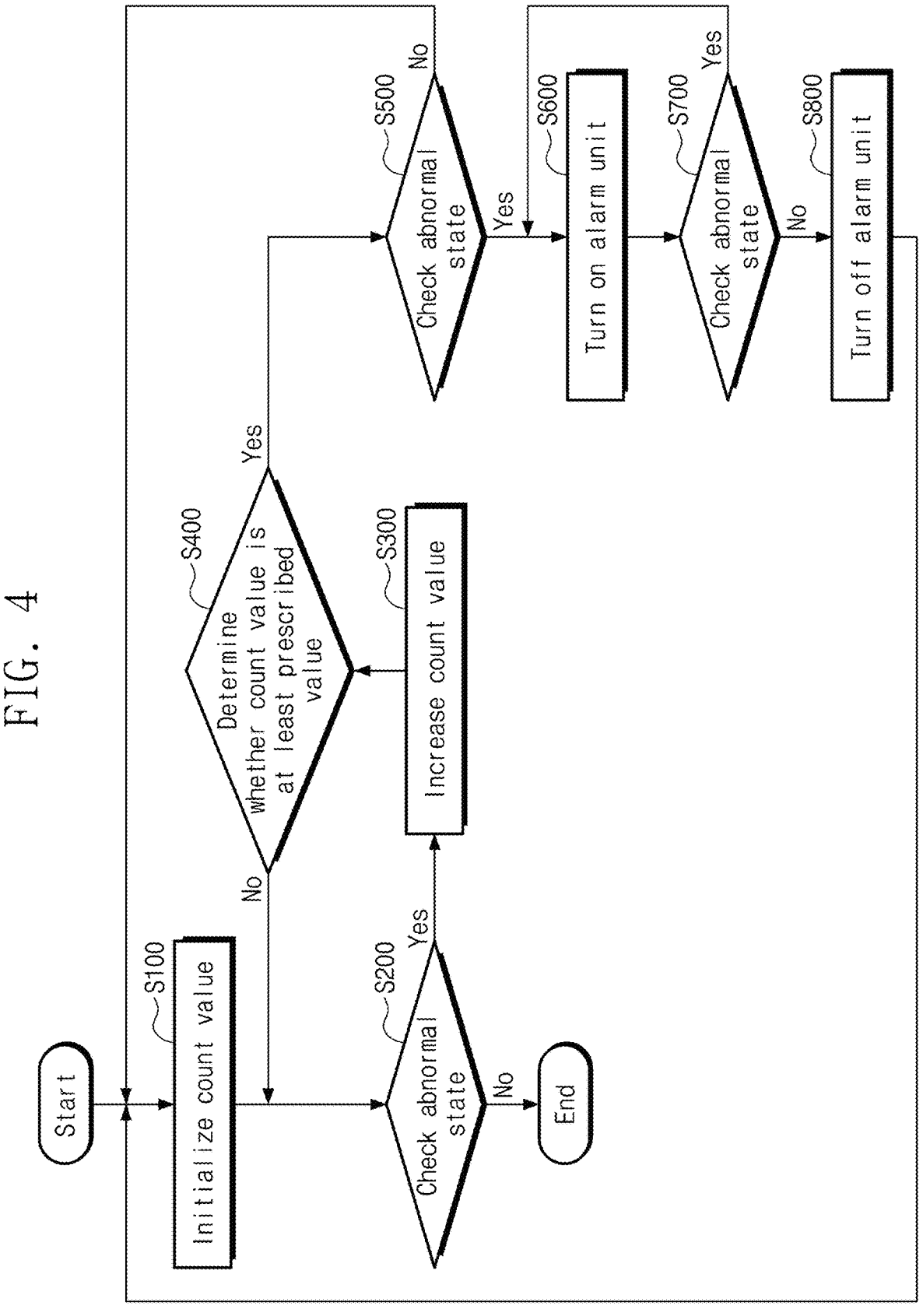
FIG. 4 is a flowchart of the operations of an automated guided vehicle and sensor unit according to an embodiment of the disclosure.

FIG. 4 is a flowchart of the operations of an automated guided vehicle and sensor unit according to an embodiment of the disclosure.

Referring to FIGS. 1 and 4, the sensor unit 100 may transmit the signal S to the control unit 200 of the automated guided vehicle AGV at every selectable time. The control unit may receive the signal S for the every selectable time.

The control unit 200 may activate the watchdog timer 400 to operate the watchdog timer 400. The control unit 200 may transmit a reset signal RS to the watchdog timer 400.

In case that receiving the reset signal RS, the watchdog timer 400 may initialize the count value (step S100). For example, initializing the count value may mean to reset, to 0, the count value of a timer in the watchdog timer 400. A step for initializing the count value (step S100) may be referred to as an initialization step S100.

Hereinafter, the control unit 200 may check an abnormal state of the sensor unit 100 (step S200). The abnormal state of the sensor unit 100 may be determined by checking a communication state of the signal S transmitted from the sensor unit 100. Namely, the abnormal state may refer to a state of poor communication, namely, a state where the control unit 200 does not receive the signal S. A step S200 for checking the abnormal state may be referred to as a first checking step S200. In case that receiving the signal S, the control unit 200 may determine that the sensor unit 100 is in a normal state. In case that it is determined that the sensor unit 100 is in the normal state, the control unit 200 may terminate the current operation and restart the initialization step S100.

In case that not receiving the signal S, the control unit 200 may determine that the sensor unit 100 is in the abnormal state.

In case that it is determined that the sensor unit 100 is in the abnormal state (step S200), the watchdog timer 400 may increase the count value (step S300). For example, the watchdog timer 400 may increase the count value by 1. The control unit 200 may determine whether the count value is at least a selectable value (step S400). For example, the selectable value may be 3. In case that the count value is smaller than the selectable value, the control unit 200 may perform the first checking step S200 again.

In case that the control unit 200 determines that the count value is equal to or greater than the selectable value to expire, the watchdog timer 400 may transmit, to the control unit 200, a timeout signal TO. The control unit 200 having received the timeout signal TO may perform a recovery operation step.

For example, in case that the count value of the watchdog timer 400 is initialized and it is determined that the sensor unit 100 is in the abnormal state S200, the control unit 200 may increase the count value (step S300). Here, the count value may be 1. Since the count value is not 3, the selectable value, the first checking step S200 may be performed again (step S400). The abnormal state of the sensor unit 100 may be rechecked. In case that it is determined that the sensor unit 100 is still in the abnormal state (step S200), the control unit 200 may increase the count value (step S300). Here, the count value may be 2. Since the count value is not 3, the selectable value, the first checking step S200 may be performed again (step S400). In case that it is determined that the sensor unit 100 is still in the abnormal state (step S200), the control unit 200 may increase the count value (step S300). Here, the count value may be 3. Since the count value is at least 3, the selectable value, the control unit 200 may perform the recovery operation.

In case that the count value of the watchdog timer 400 is, for example, initialized and it is determined that the sensor unit 100 is in the abnormal state (step S200), the control unit 200 may increase the count value (step S300). Here, the count value may be 1. Since the count value is not 3, the selectable value, the first checking step S200 may be performed again (step S400). The abnormal state of the sensor unit 100 may be rechecked. Here, in case that the communication state between the sensor unit 100 and the control unit 200 is recovered and the control unit 200 receives the signal S, it may be determined that the sensor unit 100 is not in the abnormal state (step S200). The control unit 200 may determine that the sensor unit 100 is in the normal state and terminate the operation.

The recovery operation may be an operation performed by the control unit 200 in order to ensure the safety of the user US (see FIG. 2). In case that the recovery operation is performed, the control unit 200 may control the automated guided vehicle AGV to operate at the second speed V2 (see FIG. 3). The step for performing the recovery operation may include a second checking step S500, an alarm unit turn-on step S600, a third checking step S700, and an alarm unit turn-off step S800.

In case that performing the recovery operation, the control unit 200 may recheck the abnormal state of the sensor unit 100 (step S500). Here, the step S500 for rechecking the abnormal state may be referred to as the second checking step S500.

In case that it is determined that the sensor unit 100 is in the normal state in the second checking step S500, the initialization step S100 may be performed again.

In case that it is determined that the sensor unit 100 is in the abnormal state in the second checking step S500, the control unit 200 may transmit the alarm signal AL turning on the alarm unit 300 to the alarm unit 300 (step S600). The step for turning on the alarm unit 300 may be referred to as the alarm unit turn-on step S600.

The alarm unit 300 may provide a notification to cause the user US (see FIG. 2) to detect the abnormality. The notification may be a type of an acoustic signal or a vibration signal to notify the user US of a poor communication state between the sensor unit 100 and the automated guided vehicle AGV. For example, the poor communication state may include a case where the communication is disconnected between the sensor unit 100 and the automated guided vehicle AGV and a case where the communication is delayed.

After the alarm unit turn-on step S600, the control unit 200 may check again the abnormal state of the sensor unit 100 (step S700). Here, the step for rechecking the abnormal state may be referred to as the third checking step S700. As the result, in case that the sensor unit 100 is determined to be in the abnormal state, the alarm unit turn-on unit S600 may be performed again.

In case that the alarm unit 300 is turned on, the user US may check the sensor unit 100. For example, the user US may manually reboot the sensor unit 100 or use a recovery logic in the sensor unit 100 to recover the communication state between the sensor unit 100 and the automated guided vehicle AGV.

In case that it is determined that the sensor unit 200 is in the normal state in the third checking step S700, the control unit 200 may transmit the alarm signal AL to turn off the alarm unit 300 (step S800). The step S800 for turning off the alarm unit 300 may be referred to as the alarm unit turn-off step S800.

After the alarm unit turn-off step S800, the initialization step S100 may be performed again. For example, after the step for performing the recovery operation, the initialization step S100 may be performed again.

According to the disclosure, in case that it is determined that the communication state with the sensor unit 100 is poor, the control unit 200 may perform the recovery operation. For example, the automated guided vehicle AGV may operate at the first speed V1 (see FIG. 2) in the first normal state (see FIG. 2), and at the second speed V2 (see FIG. 3) in the second normal state (see FIG. 3) and the abnormal state. In case that the user is not around, the automated guided vehicle AGV may operate at relatively fast speed to reduce the delivery time. In case that the user is around, the automated guided vehicle AGV may operate at relatively slow speed to ensure the safety of the user US. In case that the abnormal state is determined, the automated guided vehicle AGV performs the recovery operation to recover the communication state between the sensor unit 100 and the automated guided vehicle AGV. During the recovery operation, the user may be possibly around, and thus the control unit 200 may operate the automated guided vehicle AGV at the second speed V2. The automated guided vehicle AGV may be operated at a relatively slow speed to ensure the safety of the user US. Accordingly, the operation efficiency of the automated guided vehicle AGV may be improved and the total number of the automated guided vehicles AGV required in one process may be reduced. Therefore, the automated guided vehicle AGV with improved safety and reliability and a control method for the automated guided system 100 including the same may be provided.

Figure 5:
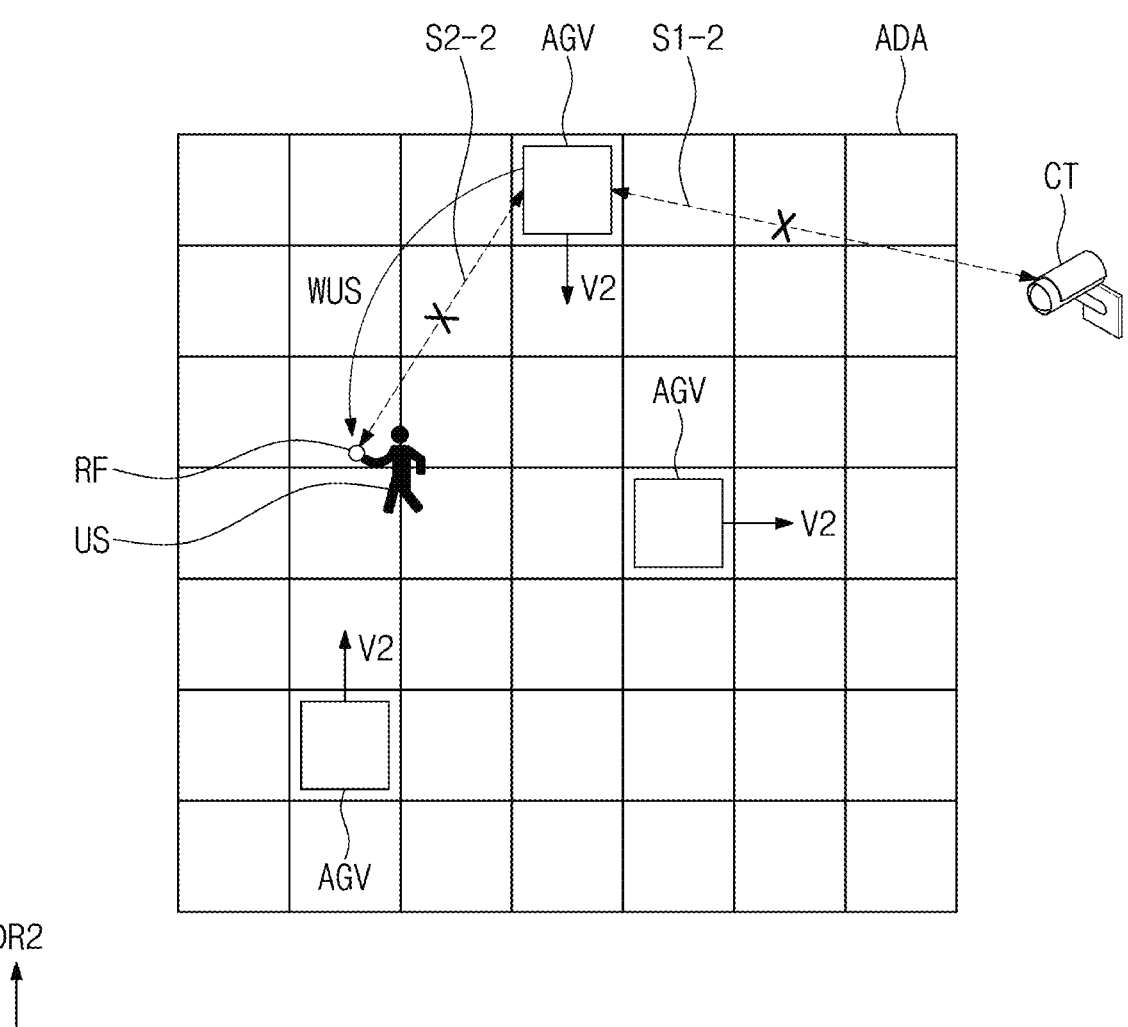
FIG. 5 is a schematic diagram showing the operations of an automated guided vehicle and sensor unit in a first abnormal state according to an embodiment of the disclosure.

FIG. 5 is a schematic diagram showing the operations of an automated guided vehicle and sensor unit in a first abnormal state according to an embodiment of the disclosure. In FIG. 5, like reference numerals are given to like elements illustrated in FIG. 3, and the description of the like elements may be omitted.

Referring to FIGS. 1, 4, and 5, the user US may move into the operation area ADA.

The signal S provided by the sensor unit 100 to the automated guided vehicle AGV may further include a 1-2nd signal S1-2 and a 2-2nd signal S2-2.

The abnormal state may be defined where the communication state between the automated guided vehicle AGV and the sensor unit 100 is poor. The abnormal state may include a first abnormal state. The first abnormal state may be defined where the control unit 200 does not receive the 1-2nd signal S1-2 and the 2-2nd signal S2-2 transmitted from the sensor unit 100 to determine that the sensor unit 100 has not detected the user's move into the operation area ADA. For example, the first abnormal state may be a state where the control unit 200 does not receive the signal S from the sensor unit 100 to determine that the sensor unit 100 has not detected the user's move into the operation area ADA even though the user US has moved into the operation area ADA.

The control unit 200 may check for a selectable time whether the 1-2nd signal S1-2 and the 2-2nd signal S2-2 are received (step S200). In case that the 1-2nd signal S1-2 and the 2-2nd signal S2-2 are not received, the control unit 200 may determine that the sensor unit 100 is in the first abnormal state.

The camera CT may generate a signal of the detected information to transmit the 1-1st signal S1-2 to the control unit 200 of the automated guided vehicle AGV at every selectable time. In case that a communication error occurs in the first abnormal state, the control unit 200 may not receive the 1-2nd signal S1-2.

The RFID tag RF may generate a signal of the detected information to transmit the 2-2nd signal S2-2 to the control unit 200 of the automated guided vehicle AGV at every selectable time. In case that a communication error occurs in the first abnormal state, the control unit 200 may not receive the 2-2nd signal S2-2.

The control unit 200 may check the communication state at every selectable time. Here, in case that the state of the sensor unit 100 is the abnormal state, the control unit 200 may transmit a wakeup signal WUS rebooting the sensor unit 100.

In case that the control unit 200 determines that the sensor unit 100 is in the first abnormal state, the watchdog timer 400 may increase the count value at every selectable time (step S300). For example, the watchdog timer 400 may increase the count value by 1.

In case that the count value increases to at least a selectable value, the watchdog timer 400 may transmit, to the control unit 200, the timeout signal TO (step S400). For example, the selectable value may be 3.

In case that receiving the timeout signal TO, the control unit 200 may control the automated guided vehicle AGA to operate at the second speed V2. The second speed V2 may be about 25 m/min or about 35 m/min. For example, the second speed V2 may be about 30 m/min.

The control unit 200 having received the timeout signal TO may perform the step for performing the recovery operation. In the step for performing the recovery operation, the control unit 200 may check again for the selectable time whether the 1-2nd signal S1-2 and the 2-2nd signal S2-2 are received (step S500).

In case that the 1-2nd signal S1-2 and the 2-2nd signal S2-2 are not received, the control unit 200 may transmit the alarm signal AL for turning on the alarm unit 300. The alarm unit 300 having received the alarm signal AL may be turned on (step S600). The alarm unit 300 may notify the user US that the sensor unit 100 in the first abnormal state.

The control unit 200 may check again for the selectable time whether the 1-2nd signal S1-2 and the 2-2nd signal S2-2 are received (step S700).

In case that the 1-2nd signal S1-2 and the 2-2nd signal S2-2 are not received, the control unit 200 may perform again the alarming turn-on step S600.

In case that confirming that the 1-2nd signal S1-2 and the 2-2nd signal S2 S1-2 have been received, the control unit 200 may determine that the sensor unit 100 is not in the first abnormal state. Not being in the first abnormal state may be defined as detecting that the user US moves into the operation area ADA. Not being in the first abnormal state may be included in the second normal state (see FIG. 3). Referring to FIG. 3, in the second normal state, the control unit 200 may control the automated guided vehicle AGA to operate at the second speed V2. In other words, in case that it is determined that the sensor unit 100 is not in the first abnormal state, the control unit 200 may control the automated guided vehicle AGA to operate at the second speed V2.

In case that confirming that the 1-2nd signal S1-2 and the 2-2nd signal S2 S1-2 have been received, the control unit 200 may transmit, to the alarm unit 300, the alarm signal AL for turning off the alarm unit 300. The control unit 200 having received the alarm signal AL may turn off the alarm unit 300 (step S800).

According to the disclosure, in case that it is determined that the communication state with the sensor unit 100 is poor, the control unit 200 may perform the recovery operation. The automated guided vehicles AGV may operate at the second speed V2 in case that the sensor unit 100 is in the first abnormal state. In case that it is determined that the sensor unit is in the first abnormal state, the automated guided vehicle AGV may perform the recovery operation to recover the communication state between the sensor unit 100 and the automated guided vehicle AGV. During the recovery operation, the user may be possibly around and the control unit 200 may operate the automated guided vehicle AGV at the second speed V2. The automated guided vehicle AGV may operate at a relatively slow speed to ensure the safety of the user US. Therefore, the automated guided vehicle AGV with improved safety and reliability and the control method for the automated guided system 100 including the same may be provided.

Figure 6:
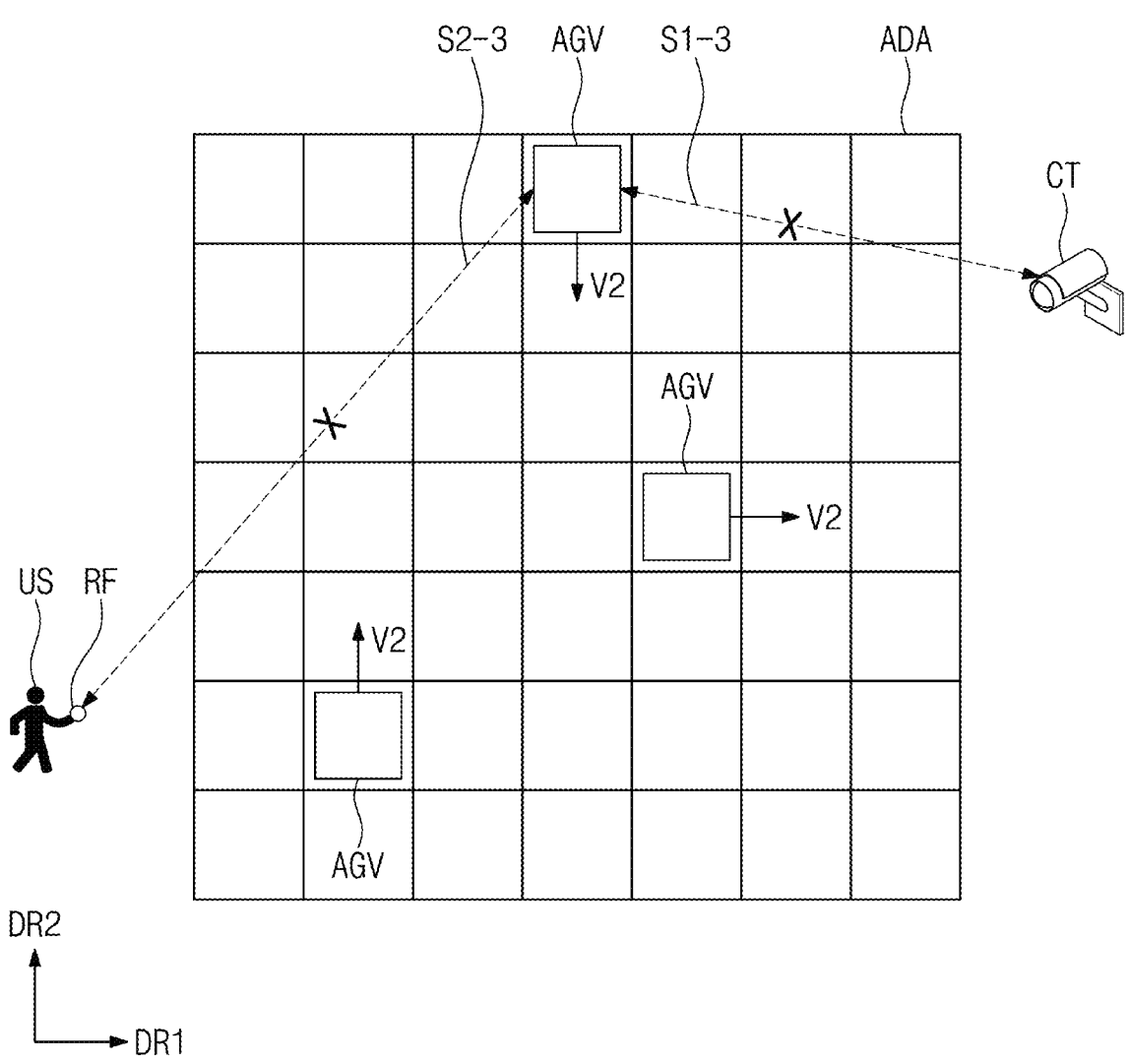
FIG. 6 is a schematic diagram showing the operations of an automated guided vehicle and sensor unit in a second abnormal state according to an embodiment of the disclosure.

FIG. 6 is a schematic diagram showing the operations of an automated guided vehicle and sensor unit in a second abnormal state according to an embodiment of the disclosure. In description of FIG. 6, like reference numerals are given to like elements illustrated in FIG. 2, and the description of the like elements may be omitted.

Referring to FIGS. 1, 4, and 6, the user US may move out of the operation area ADA.

The signal S provided by the sensor unit 100 to the automated guided vehicle AGV may further include a 1-3rd signal S1-3 and a 2-3rd signal S2-3.

The abnormal state may further include a second abnormal state. The second abnormal state may be defined where the control unit 200 does not receive the 1-3rd signal S1-3 and the 2-3rd signal S2-3 transmitted from the sensor unit 100 to determine that the sensor unit 100 does not detect the moving of the user US. For example, the second abnormal state may be a state where the control unit 200 does not receive the signal S from the sensor unit 100 to determine that the sensor unit 100 has not detected the user's move out of the operation area ADA even though the user US has moved out of the operation area ADA.

The control unit 200 may check for the selectable time whether the 1-3rd signal S1-3 and the 2-3rd signal S2-3 are received (step S200). In case that the 1-3rd signal S1-3 and the 2-3rd signal S2-3 are not received, the control unit 200 may determine the sensor unit 100 to be in the second abnormal state.

The camera CT may generate a signal of the detected information to transmit the 1-3rd signal S1-3 to the control unit 200 of the automated guided vehicle AGV at every selectable time. In case that a communication error occurs in the second abnormal state, the control unit 200 may not receive the 1-3rd signal S1-3.

The RFID tag RF may generate a signal of the detected information to transmit the 2-3rd signal S2-3 to the control unit 200 of the automated guided vehicle AGV at every selectable time. In case that a communication error occurs in the second abnormal state, the control unit 200 may not receive the 2-3rd signal S2-3.

In case that the control unit 200 determines that the sensor unit 100 is in the second abnormal state, the watchdog timer 400 may increase the count value at every selectable time (step S300). For example, the watchdog timer 400 may increase the count value by 1.

In case that the count value increases to at least a selectable value, the watchdog timer 400 may transmit, to the control unit 200, the timeout signal TO (step S400). For example, the selectable value may be 3.

In case that receiving the timeout signal TO, the control unit 200 may control the automated guided vehicle AGA to operate at the second speed V2. The second speed V2 may be about 25 m/min or about 35 m/min. For example, the second speed V2 may be about 30 m/min.

The control unit 200 having received the timeout signal TO may perform the step for performing the recovery operation. In the step for performing the recovery operation, the control unit 200 may check again whether the 1-3rd signal S1-3 and the 2-3rd signal S2-3 are received for the selectable time (step S500).

In case that the 1-3rd signal S1-3 and the 2-3rd signal S2-3 are not received, the control unit 200 may transmit the alarm signal AL for turning on the alarm unit 300. The alarm unit 300 receiving the alarm signal AL may be turned on (step S600). The alarm unit 300 may notify the user US that the sensor unit 100 is in the second abnormal state.

The control unit 200 may check again for the selectable time whether the 1-3rd signal S1-3 and the 2-3rd signal S2-3 are received (step S700).

In case that the 1-3rd signal S1-3 and the 2-3rd signal S2-3 are not received, the control unit 200 may perform again the alarming turn-on step S600.

In case that confirming that the 1-3rd signal S1-3 and the 2-3rd signal S2 S1-3 have been received, the control unit 200 may determine that the sensor unit 100 is not in the second abnormal state. Not being in the second abnormal state may be defined as detecting that the user moves out of the operation area ADA. Not being in the second abnormal state may be included in the first normal state (see FIG. 2). Referring to FIG. 2, the control unit 200 in the first normal state (see FIG. 2) may control the automated guided vehicle AGA to operate at the first speed V1. In other words, in case that determining that the sensor unit 100 is not in the second abnormal state, the control unit 200 may control the automated guided vehicle AGA to operate at the first speed V1.

In case that confirming that the 1-3rd signal S1-3 and the 2-3rd signal S1-3 have received, the control unit 200 may transmit, to the alarm unit 300, the alarm signal AL for turning off the alarm unit 300. The control unit 200 having received the alarm signal AL may turn off the alarm unit 300 (step S800).

According to the disclosure, in case that it is determined that the communication state with the sensor unit 100 is poor, the control unit 200 may perform the recovery operation. The automated guided vehicles AGV may operate at the second speed V1 in case that the sensor unit 100 is in the second abnormal state. In case that it is determined that the sensor unit 100 in the second abnormal state, the automated guided vehicle AGV may perform the recovery operation to recover the communication state between the sensor unit 100 and the automated guided vehicle AGV. During the recovery operation, the user may be possibly around and the control unit 200 may operate the automated guided vehicle AGV at the second speed V2. The automated guided vehicle AGV may operate at a relatively slow speed to ensure the safety of the user US. Therefore, the automated guided vehicle AGV with improved safety and reliability and the control method for the automated guided system 100 including the same may be provided.

According to the aforementioned, a vehicle navigation system may be constructed using the automated guided vehicle in consideration of the safety of the user within a factory. In case that the user is not present in the operation area, the navigation speed of the automated guided vehicle may be maximized to reduce a goods delivery time of the automated guided vehicle and thus the number of the automated guided vehicles may be reduced. The vehicle navigation system may also confirm a malfunction of the sensor that detects the user and reduces the speed. As a result, the driving efficiency of the automated guided vehicle may be improved and a delivery system may be constructed in consideration of the safety of the user.

Although embodiments have been described, it is understood that the disclosure should not be limited to these embodiments but various changes and modifications can be made by one of ordinary skill in the art within the spirit and scope of the disclosure and as hereinafter claimed.

What is claimed is:

1. A control method for an automated guided system comprising:
 a step of providing an automated guided vehicle comprising a sensor and a watchdog timer that detects a user, a controller that receives a signal from the sensor, and an alarm that provides an alarm to the user;
 an initializing step of receiving, by the controller, the signal and initializing, by the watchdog timer, a count value;
 a first checking step of checking, by the controller, an abnormal state of the sensor;
 a count increasing step of increasing, by the watchdog timer, the count value in case that it is determined that the sensor is in the abnormal state; and
 a step of performing, by the controller, a recovery operation in case that the count value is equal to or greater than a selectable value,
 wherein the step of performing the recovery operation comprises:
 a second checking step of rechecking, by the controller, the abnormal state of the sensor;
 a step of turning on, by the controller, the alarm in case that it is determined that the sensor is in the abnormal state;
 a third checking step of rechecking, by the controller, the abnormal state of the sensor; and
 a step of turning off, by the controller, the alarm in case that it is determined that the sensor is in a normal state changed from the abnormal state.

2. The control method of claim 1, wherein the automated guided vehicle operates at a first speed or a second speed slower than the first speed.

3. The control method of claim 2, wherein the second speed is about a half of the first speed.

4. The control method of claim 2, wherein
 the sensor comprises a door sensor, and
 the automated guided vehicle operates at the second speed in case that the door sensor is detected to be open.

5. The control method of claim 3, wherein
 the normal state comprises a first normal state where the controller determines that the user is not present in an operation area of the automated guided vehicle, and
 in the first normal state, the controller controls the automated guided vehicle to operate at the first speed.

6. The control method of claim 5, wherein
 the normal state further comprises a second normal state where the controller determines that the user is present in the operation area of the automated guided vehicle, and,
 in the second normal state, the controller controls the automated guided vehicle to operate at the second speed.

7. The control method of claim 6, wherein
 the abnormal state comprises:
 a first abnormal state where the controller does not receive the signal to determine that the sensor has not detected the user's move into the operation area even though the user has moved into the operation area; and
 a second abnormal state where the controller does not receive the signal to determine that the sensor has not detected the user's move out of the operation area even though the user has moved out of the operation area, and
 the step of performing the recovery operation further comprises a step of controlling, by the controller, the automated guided vehicle to operate at the second speed.

8. The control method of claim 1, wherein the first checking step is performed in case that the count value is less than the selectable value after the step of increasing the count value.

9. The control method of claim 1, wherein the initialization step is performed again in case that it is determined in the first checking step that the sensor is in the normal state.

10. The control method of claim 1, wherein the initialization step is performed in case that it is determined in the second checking step that the sensor is in the normal state.

11. The control method of claim 1, wherein the initialization step is performed again after the step of performing a recovery operation.

12. The control method of claim 1, wherein the step of turning on the alarm is performed in case that it is determined in the third checking step that the sensor is in the abnormal state.

13. The control method of claim 1, wherein the count increasing step comprises a step of increasing the count value by 1.

14. The control method of claim 13, wherein the selectable value is about 3.

15. The control method of claim 1, wherein
 the controller checks a communication state with the sensor at every selectable time, and
 transmits a wakeup signal for rebooting the sensor in case that the sensor is in the abnormal state.

16. An automated guided vehicle comprising:
 a controller that receives a signal from an external sensor, a watchdog timer, and an alarm, wherein
 the controller determines whether the sensor is in a normal state or an abnormal state, and selects a speed of the automated guided vehicle between a first speed or a second speed slower than the first speed,
 the watchdog timer initializes a count value in case that the sensor is in the normal state, and increases the count value in case that the sensor is in the abnormal state, and the controller rechecks the abnormal state of the sensor in case that the count value is equal to or greater than a selectable value, turns on the alarm in case that it is determined that the sensor is in the abnormal state, rechecks the abnormal state of the sensor after the alarm is turned on, turns off the alarm in case that it is determined that the sensor is in the normal state changed from the abnormal state, and selects the second speed in case that it is determined that the sensor is in the abnormal state.

17. The automated guided vehicle of claim 16, wherein the normal state comprises a first normal state where the controller determines that a user is not present in an operation area of the automated guided vehicle, and the automated guided vehicle operates at the first speed in case that the sensor is in the first normal state.

18. The automated guided vehicle of claim 17, wherein the normal state comprises a second normal state where the controller determines that the user is present in the operation area of the automated guided vehicle, and the automated guided vehicle operates at the second speed in case that the sensor is in the second normal state.

19. The automated guided vehicle of claim 18, wherein the abnormal state comprises:

a first abnormal state where the controller does not receive the signal to determine that the sensor has not detected the user's move into the operation area even though the user has moved into the operating area; and a second abnormal state where the controller does not receive the signal to determine that the sensor has not detected the user's move out of the operation area even though the user has moved out of the operation area, and the automated guided vehicle operates at the second speed in case that the count value is at least the selectable value.

20. The automated guided vehicle of claim 16, wherein the second speed is about a half of the first speed.

\* \* \* \* \*